United States Patent [19]

Klingl

[11] Patent Number: 4,964,498
[45] Date of Patent: Oct. 23, 1990

[54] DEVICE FOR CONVEYING WORKPIECES

[75] Inventor: Karl-Heinz Klingl, Neusäss, Fed. Rep. of Germany

[73] Assignee: Georg Spiess GmbH, Gersthofen, Fed. Rep. of Germany

[21] Appl. No.: 372,895

[22] Filed: Jun. 28, 1989

[30] Foreign Application Priority Data

Jul. 16, 1988 [DE] Fed. Rep. of Germany ....... 3824230

[51] Int. Cl.$^5$ ............................................. B65G 1/12
[52] U.S. Cl. .............................. 198/347.1; 198/465.3
[58] Field of Search ............................ 198/347, 465.3

[56] References Cited

U.S. PATENT DOCUMENTS

| 2,251,197 | 7/1941 | Nestmann | 198/465.3 |
| 2,274,842 | 3/1942 | McCann | 198/465.3 |
| 2,944,656 | 7/1960 | Balkema | 198/465.3 X |
| 3,763,991 | 10/1973 | Batik | 198/465.3 |
| 3,993,189 | 11/1976 | Khoylian et al. | 198/465.3 X |
| 4,018,325 | 4/1977 | Rejsa | 198/347 |
| 4,164,391 | 8/1979 | Howard et al. | 198/465.3 X |
| 4,196,802 | 4/1980 | Lorrentzen | 198/465.3 |
| 4,202,436 | 5/1980 | Kristapovich et al. | 198/465.3 |
| 4,503,968 | 3/1985 | Khoylian et al. | 198/465.3 |

FOREIGN PATENT DOCUMENTS

| 0730822 | 1/1943 | Fed. Rep. of Germany ... 198/465.3 |
| 1708885 | 11/1970 | Fed. Rep. of Germany ...... 198/347 |
| 0004533 | 1/1987 | Japan .................................. 198/465.3 |

Primary Examiner—Joseph E. Valenza
Assistant Examiner—D. Glenn Dayoan
Attorney, Agent, or Firm—Edwin D. Schindler

[57] ABSTRACT

In a method for the conveying of workpieces such as printed circuit boards along a conveying path in steps wherein for temporary buffering storage the workpieces are diverted along at least one loop with two temporary storage paths running in opposite directions, the invention ensures that the workpieces are not inverted and are kept in the same order since the length of such paths being changed jointly in a way dependent on an increase and decrease of the degree of charging thereof, in the case of which after each number of steps, equal to the number of steps of the conveying path the overall temporary storage device is moved by one step and therebetween after each step of the conveying path the temporary paths are moved with the temporary storage device inactive through respectively one step and after each movement of the temporary storage paths with the temporary storage device inactive and the end of the temporary paths there is a parallel transfer of the workpieces from one temporary storage path to the next one.

17 Claims, 5 Drawing Sheets

DEVICE FOR CONVEYING WORKPIECES

BACKGROUND OF THE INVENTION.

The invention relates to a method and to a device for the conveyance of workpieces, more especially in the form of circuit boards, in sequence along a conveyance path in steps.

The production of circuit boards or like articles involves their conveyance through various working stations of an automatically controlled production line. If failure of one working station occurs, the flow of material will be interupted at this point. On the other hand it is normally not possible for the supply of further material to be interrupted and it is thus necessary to temporarily store the workpieces until the failure has been dealt with. In this respect it is to be taken into account that more especially in the case of the production of circuit boards batches of identically sized boards may be comparatively small and that after each batch has run through the plant retooling is needed at each individual station, this generally being performed automatically. A change in the sequence of the series of circuit boards might thus lead to interference with the entire production process and make complex adjustments necessary. Furthermore, it is to be taken into account that inversion of the workpieces as a result of the temporary storage is undesired.

There has already been a proposal to provide a circulating element with peripherally arranged receiving compartments for the temporary storage of workpieces. However when using this device it is only possible to avoid inversion of the workpieces, if the circulating element is driven in opposite directions for storing and releasing the workpieces, this not only involving a change in the order of the workpieces but also at the same time having to hold up the supply of further workpieces. This however means that the above requirements are not fulfilled.

SUMMARY OF THE INVENTION.

Taking this prior art as a starting point, one object of the present invention is to make it possible for the workpieces to be temporarily stored during conveyance in such manner that the order and position of the workpieces is not changed.

A further object of the invention is to nevertheless make possible stepwise filling of the temporary storage device without intermediate emptying.

In order to achieve this or other objects appearing herein, the invention provides a method in which for temporary storing the workpieces are able to be diverted via at least one loop with two temporary storage paths running in opposite directions transversely in relation to the conveying path, the length of the paths taken jointly being varied in accordance with an increase or decrease in the degree of charging thereof, and after each number, corresponding to the number of temporary storage paths present, of steps of the conveying path the entire temporary storage device is moved by one step respectively with the temporary storage paths in it stationary and therebetween after each step of the conveying path the temporary storage paths are moved by one respective step with the temporary storage device stationary and after each movement of the temporary storage paths there is a transfer, parallel to the conveying path, of the workpieces from one temporary storage path to the next one.

Taking as a starting point a system with longitudinal conveying device and a temporary storage device arranged transversely thereto the object of the invention may be attained by such a design that the longitudinal conveying device runs through a basket able to be moved transversely in relation to it, and on the basket there are at least two continuous lifts (that is to say lifts with two upright runs moving in opposite directions so that articles may be moved vertically by one run, and sometimes referred to by their German designation, "paternoster lift") arranged in parallelism to the direction of motion of the basket and offset in relation to each other in the direction of motion of the longitudinal so that they may be driven in opposite directions, such continuous lifts being able to have their arms fitted with workpiece carriers able to be moved in parallelism to the longitudinal conveyance direction and intersecting in the part between the arm ends and are secured to prevent sliding and at the arm ends the continuous conveyors are able to be shifted by means of a sliding device, which provided on the basket, in opposite directions an amount equal to the spacing between the continuous lifts in parallelism to the longitudinal conveying direction.

This design ensures that the temporary storage device is filled from its outlet so that as regards storing the workpieces it is question of first in first out at the outlet, while the temporary storage device may be further filled while the first workpiece to be put in is available at the outlet. When workpieces are able to be discharged from the outlet of the temporary storage device, filling of the latter is halted and the workpieces move through it continuously without changing their order so that irrespectively of whether the temporary storage device is filled or only partly filled, the temporary storing action is to be terminated or interrupted and the production line is to be supplied with workpieces in the desired order without having to interrupt the further supply of material prior to filling up the temporary storage device to a greater degree. There is thus the advantage that between sequential storing operations with incomplete filling of the temporary storage device intermediate emptying of the temporary storage device is not required The invention thus ensures a continuous buffering or temporary storing effect. A further advantage of the invention is to be seen in the fact that owing to the opposite motion in the storing paths and the transfer between them in a direction parallel to the paths, on passing through the temporary storage device the workpieces are not turned or inverted and thus not only leave the temporary storage device in the desired order but also in the desired position and with the desired alignment.

In order to fill up the temporary storage device the two oppositely moving storage paths, which are formed by the parts of the continuous lifts which extend over the longitudinal conveying device, are extended and reversed by suitable operation of the basket containing the temporary storage device. In the case of motion of the articles through the temporary storage device in its filled or partly filled condition, the length of the temporary storage paths is kept constant simply by not causing the basket to move, this leading to a simple control system.

In accordance with a further development of the invention it is possible for the basket to be accommodated in a tower, which has the longitudinal conveying device passing through it, so as to be able to be moved upwards and downwards, the clearance height of the tower exceeding the height of the basket by an amount at least equal to the length of the straight arms of the continuous lifts. In this respect the conveying device may be arranged with a ground clearance equal to at least the length of the straight arms of the continuous lifts. These features lead to a compact arrangement requiring only a small amount of floor space, since the workpieces are then able to be temporarily stored over each other.

It is an advantage if two mutually offset continuous lifts are driven in opposite directions by at least one bevel drive so that one input and two outputs are connected together. The result is then automatically the desired oppositely directed motion of the continuous lifts and at the same time precise synchronism.

It is convenient if the mutually offset continuous lifts have bearer rails which are attached to endless chains running round the upper and lower end of the basket, and extending in the direction of motion of the longitudinal conveying device, the workpiece carriers being able to be received on such rails for sliding motion thereon. These features make possible smooth transfer of the workpiece carriers from one continuous lift to another and then back again.

In accordance with a further expedient feature of the invention at least the bearer rails provided on one side of the longitudinal conveyor device of the two continuous lifts and the guide elements fitting between the bearer rails of the workpiece carriers are in the form of elongated prisms, this leading to the advantage of a reliable interlocking action in a direction across the desired direction of motion.

In accordance with a further development of the invention in the direction reversing parts provided at the upper and lower ends of the basket, of the continuous lifts, the workpiece carriers may be secured by means of guide rails arranged in parallelism to the direction of continuous lift motion, in order to prevent sliding out of position, such guide rails having a guide channel, ending in the reversal part, for a holding element, extending therethrough, of the workpiece carriers. This ensures that the workpiece carriers are not able to be become displace of their own accord in a direction parallel to the longitudinal conveyor device when not in the desired transfer position.

A further possible feature of the invention is one in which the transferring device is in the form of a circulating member fitted around the continuous lifts and which is provided with entraining means with which opposite holders, provided on the workpiece carriers may be engaged and disengaged. This ensures that the transfer of the workpiece carriers from one continuous lift to the next one and the return in the opposite direction may be performed using one and the same component, this leading to a simplified construction and a high degree of functional reliability.

In accordance with a further advantageous feature of the invention the longitudinal conveyor device, which is in the form of a belt guide comprising mutually offset belts, has a respective gap in the vicinity of each continuous lift. This ensures that the workpiece carriers, which intersect with the longitudinal conveyor device are able to have at least one transverse beam extending over the breadth of the basket, so that the support rails are able to be attached to the beams which are able to be placed between the belts of the belt guide, this considerably simplifying the design.

Further advantageous developments and features of the invention will be gathered from the ensuing account of only one preferred embodiment thereof with reference to the drawing and in connection with the claims.

DETAILED DESCRIPTION OF THE INVENTION

Figure 1:
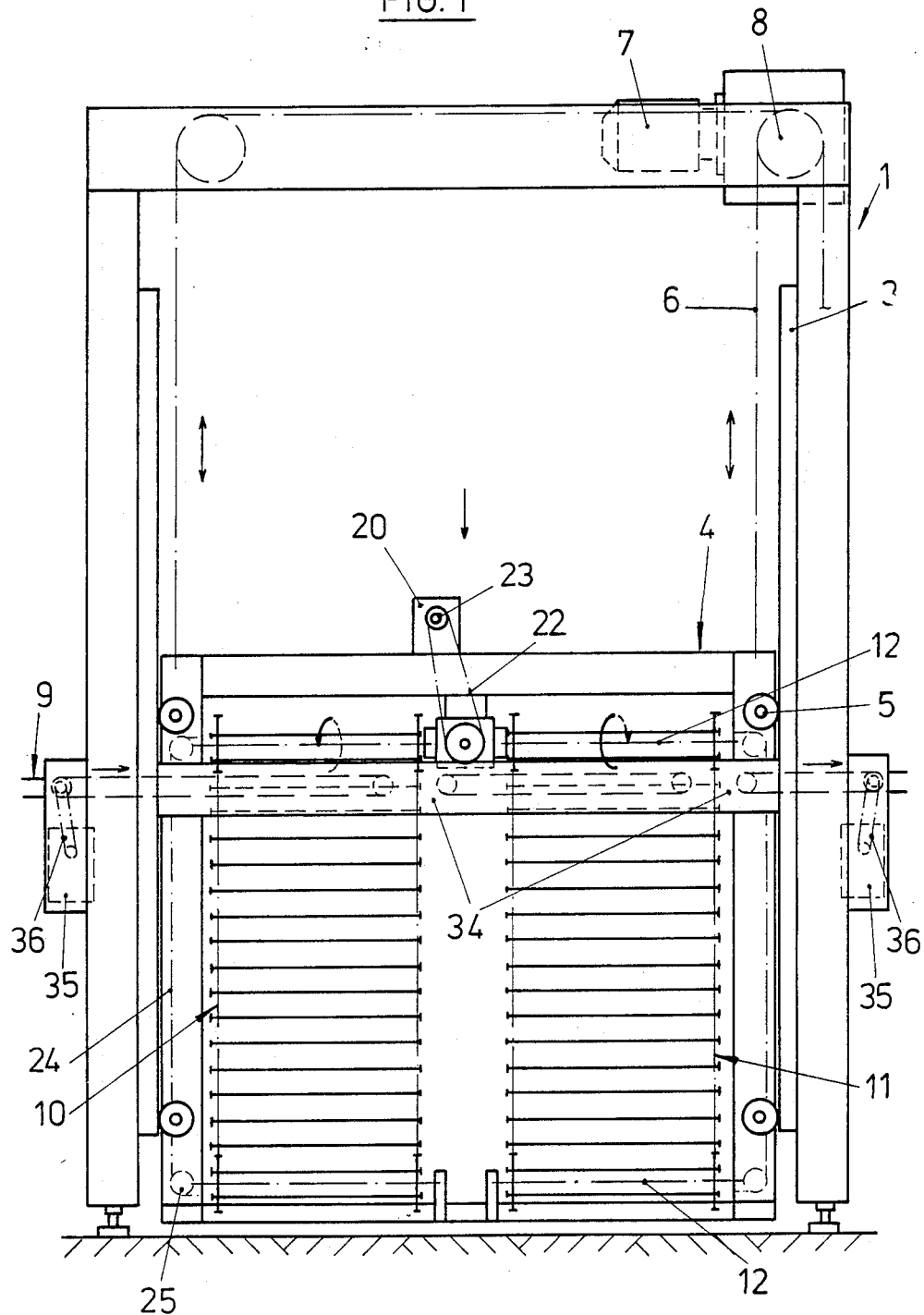
FIG. 1 is a side view of an apparatus in accordance with the instant invention.
Figure 2:
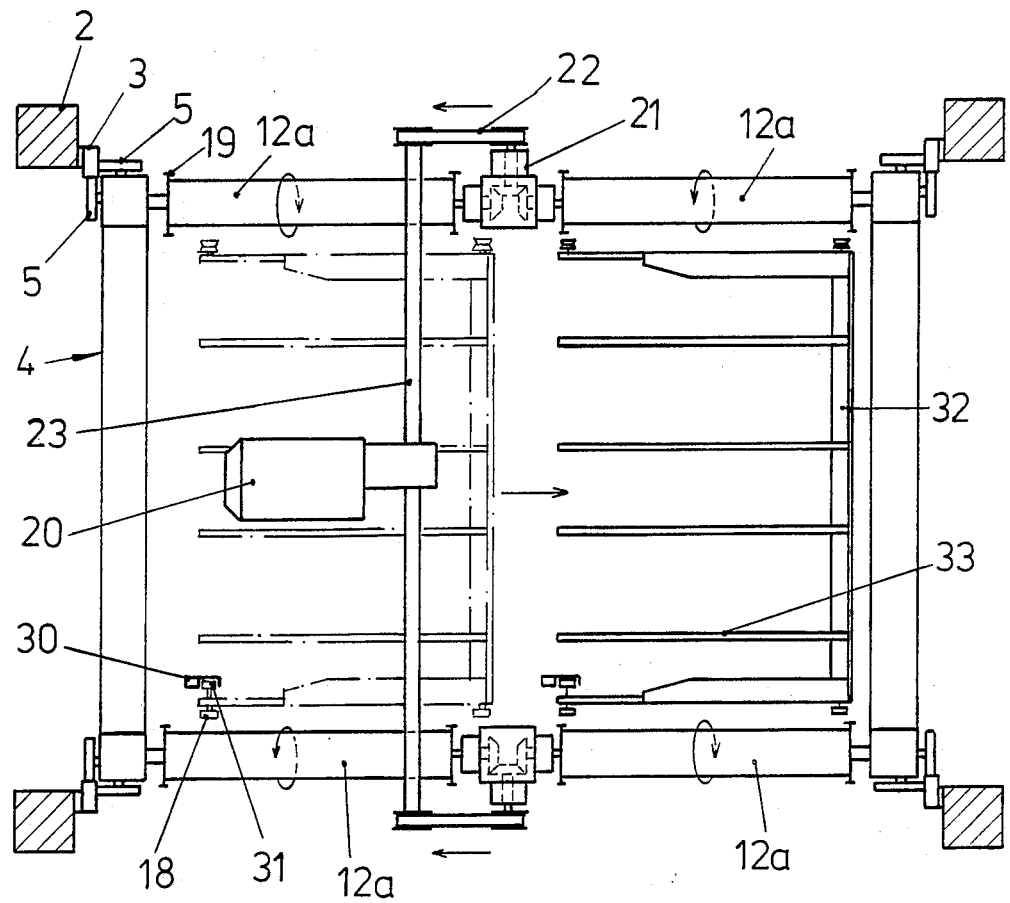
FIG. 2 is a plan view looking down on the arrangement of FIG. 1, partly in section.

The temporary storage device shown in FIG. 1 comprises a tower 1 with four corner columns 2, which are arranged at the corners of a rectangle, as will best be seen from FIG. 2. At their inwardly directed edges the corner columns 2 are provided with adjustable guide rails 3, on which a basket 4 runs upwards and downwards in the tower 1. For this purpose the basket 4, which is formed by a cubic frame with beams at the corners, is provided with wheels 5, which are placed at its upright outer edges and right angles to each other and run on the facing sides of the guide rails 3, as will also be best seen from FIG. 2. The basket 4 is suspended on lifting chains 6 which at the top end of the tower 1 run over bend pulleys and run to drive wheels 8 which are driven by a lifting motor 7 attached to the tower 1. The clearance height of the tower 1 leaves sufficient vertical clearance for motion of the basket 4.

The tower 1 straddles a longitudinal conveyor device 9 which is in the form of a vertically immovable belt guide having a suitable ground clearance, by which the workpieces such as circuit boards or the like may be conveyed in order to a processing station. The longitudinal conveyor device 9 in this respect extends horizontally through the basket 4, which is mounted in the tower 1 so that it may move vertically. The ground clearance of the longitudinal conveyor device 9 is such that it extends through top of the basket 4 in the lowest position of the basket 4, shown in FIG. 1. The degree of vertical freedom of the basket 4 is such that it may be raised to such an extent that the longitudinal conveyor device 9 extends through it in the uppermost position in the lower basket part.

The basket 4 is provided with two continuous lifts 10 and 11 which are offset mutually in the direction of motion of the longitudinal conveyor device with bend axes 12 located over each other parallel to the longitudinal conveyor device. One of these axes is over the longitudinal conveyor device 9 and the other is below it. The up and down runs of the endless continuous lift 10 and 11 thus intersect the conveyance plane of the longitudinal conveyor device 9. Each continuous lift 10 and 11 may be best seen from FIG. 3 to consist of two endless runners 13 and 14 which are placed opposite to each other so as to flank the longitudinal conveyor device 9 on the outer sides of the basket parallel to the longitudinal conveyor device. The mutually adjacent runs of the runners 13 and 14 slidingly bear palette-like workpiece carriers 15 or trays on their side ledges. For this purpose the oppositely placed endless runners 13 and 14 are equipped with rails 16 on their entire periphery, such rails 16 extending in the direction of motion of the longitudinal conveyor device 9 and serving to form duct channels 17 with a mutual spacing between them. The palette-like workpiece carriers 15 possess lateral wheels 18 which may be inserted into the guide channels 17.

Figure 3:
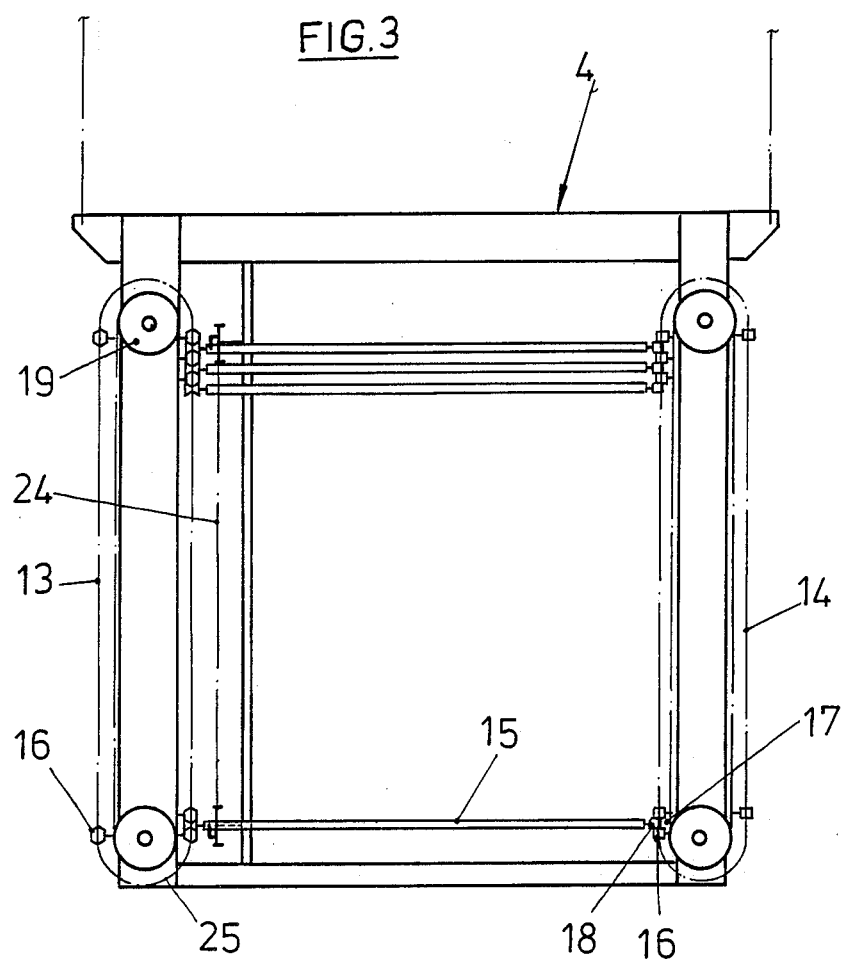
FIG. 3 is an end-on view of the basket containing the temporary storage device or buffer magazine.

Adjacent to a runner, in the case of the design of FIG. 3, adjacent to the right hand runner 14 the rails 16 and accordingly the guide channels 17 delimited by them and the wheels 18 fitting into them have a rectangular cross section. Adjacent to the opposite runner, in the present case the left hand runner 13, the rails 16 have such a cross section that the guide channels 17 have the cross section of a prism. The wheels 18 with a suitably adapted form are thus laterally positively held in place that is to say held in place in a direction which is transverse in relation to the length of the rails 16, this best being seen from FIG. 4.

The runners 13 and, respectively, 14 consist of two pairs of chains spaced out over the length of the rails 16 which they carry. The chains run over bend members 19 arranged at the top and bottom of the basket, such bend members 19 being mounted on the shafts 12a which define the axes 12. The shafts are in the form of drums in order to guide the rails 16 at the point of change in direction, as will best be seen from FIG. 2. One of the shafts 12a, in the present case the respective upper shaft, is driven. A drive motor 20 is mounted on the basket 4 for driving the oppositely placed runners 13 and 14 of the two continuous lifts 10 and 11.

The two continuous lifts 10 and 11, which are placed one after the other in the conveying direction of the logitudinal conveyor device 9, are driven in opposite directions. The upstream continuous lift 10 is, as may be seen from FIGS. 1 and 5, so driven that the adjacent runs, flanking the longitudinal conveyor device 9, of its runners 13 and 14 move in an upward direction. The downstream continuous lift 11 is so driven that the inner runs, which flank the longitudinal conveyor device 9, of its runners 13 and 14 are moved from the top towards the bottom. In order to provide for this oppositely directed motion there is a respective bevel drive 21 arranged between aligned shafts 12a of the two runners 13 and, respectively, 14, such bevel drive having an input connected by gear means 22 with the drive motor 20 and two outputs connected with the shafts 12a and rotating in opposite directions. The two gear means 22 on the two sides of the bevel drives 21 arranged on the two sides of the basket 4 are bridged over by a shaft 23 extending along the full length of the basket 4, and which is driven by the drive motor 20 so that there is precisely synchronous operation. As will be seen from FIGS. 1 and 2 the drive motor 20 is mounted on the basket.

Figure 5:
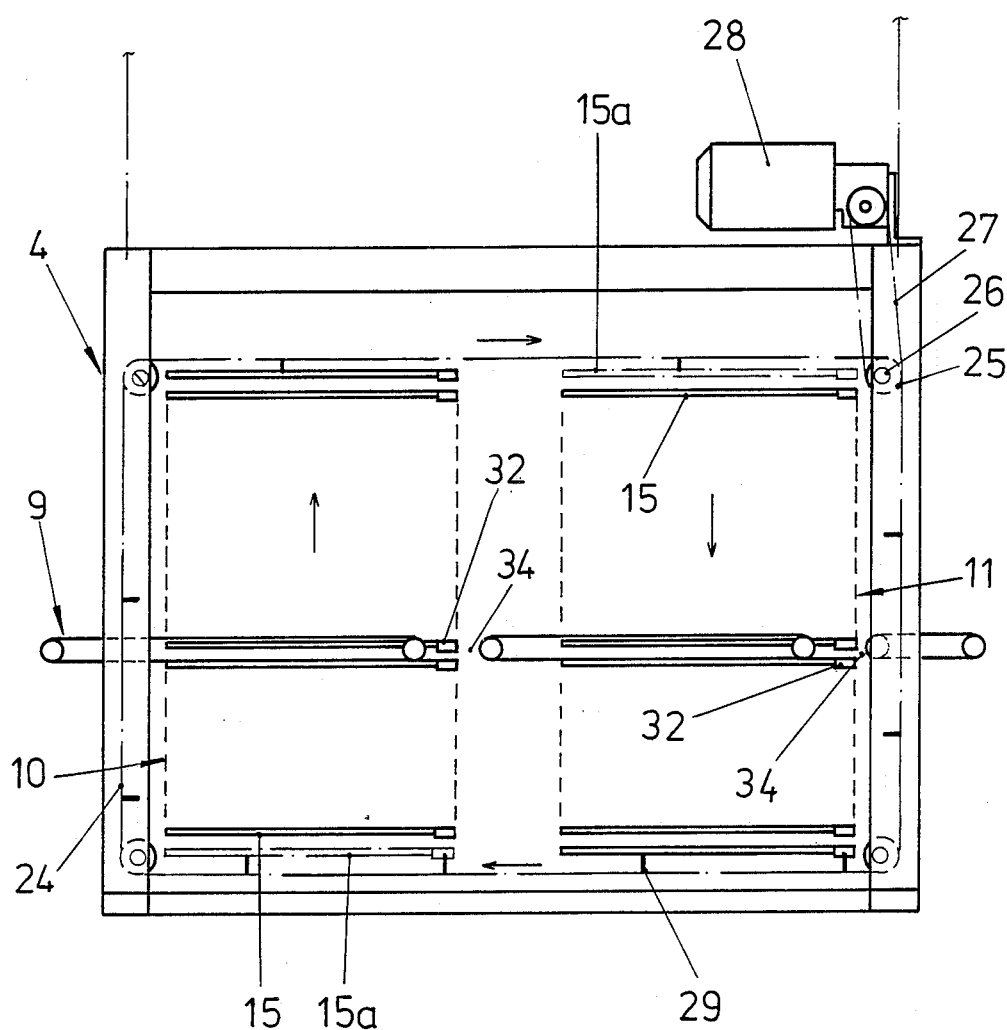
FIG. 5 is a side view of the basket in a middle position.

As will best be apparent from FIG. 5, the workpiece carriers 15 are transferred at the top end of the straight, inner runs of the continuous lift runners 13 and 14 by the upward continuous lift onto the downward continuous lift 11 and at the lower end of the straight inner run of the continuous lift runners 13 and 14 are transferred from the downstream continuous lift 11 to the upstream continuous lift 10 so that there is a circulation of the workpiece carriers 15. The number of the workpiece carriers 15 on each continuous lift 10 and 11 is at least less than the number of guide channels 17 present at the respective straight inner runs of the continuous lift runners 13 by about unity and more especially exactly unity, the free guide channel 17 being in each case the uppermost or lowermost guide channel of a continuous lift. Even in the extreme end positions of the basket 4 this guide channel is located over and, respectively, under the longitudinal conveyor device 9 so that the circulation of the workpiece carriers 15 crosses the conveyance plane of the longitudinal conveyor device 9 in the vicinity of the upstream continuous lift 10 in an upward direction and in the vicinity of the downstream continuous lift 11 in a downward direction. The workpiece carriers 15 in the guide channels 17 are aligned to be in parallelism with the longitudinal conveyor device owing to the alignment of the rails 16 to be parallel to the longitudinal conveyor device and on transfer from one continuous lift to the other they are transferred in a direction parallel to the longitudinal conveyor device. The workpiece carriers 15 thus not turned even although the continuous lifts 10 and 11 are moved in opposite directions; the workpiece carriers 15 are not turned over and maintain their alignment, that is to say the upper side of the workpiece carriers 15 remains facing upwards during the full circuit.

Figure 4:
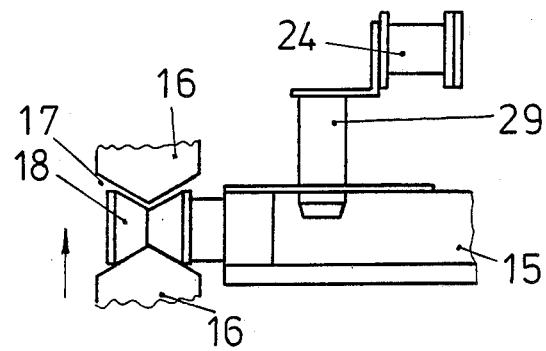
FIG. 4 shows a detail of the arrangement of FIG. 3.

In order to effect transfer of the workpiece carriers 15 over the longitudinal conveyor device 9 downstream and under the longitudinal conveyor device 9 upstream the basket 4 is provided with a transfer device 24, which is in the form of a circulating member fitting round the two continuous lifts 10 and 11, as is indicated in FIG. 1 and, in more detail, in FIG. 5. In the vicinity of the upstream and downstream end of the basket 4 the circulating member which forms the transfer device 24 has vertically extending branches, that is to say branches extending through the plane of the longitudinal conveyor device 9 and in the vicinity of the upper and lower ends of the straight runs of the continuous lift runners 13 and 14 it has horizontally extending branches which extend horizontally, that is to say parallel to the longitudinal conveyor device and in the direction of displacement of the workpiece carriers 15. In FIG. 2 the transfer device 24 is omitted in order to make the drawing more readily intelligible. The circulating member forming the transfer device 24 is formed by an endless chain or and endless belt, which is trained over the bend members 25 arranged at the corner points of the rectangular course, the axes of the bend members 25 extending transversely in relation to the direction of conveyance of the longitudinal conveyor device 9. The bend members 25 are mounted on shafts 26 defining these axes, one of such shafts being connected via gear means 27 with a drive motor 28 mounted on the basket 4 as will also be seen from FIG. 5. The circulating member 24 forming the transfer means 24 is provided with inwardly projecting drive members 29 on its periphery which in the present case are simply in the form of pins adapted to come into engagement with the workpiece carriers 15 or, respectively, the opposite holders on the carrier side when the workpiece carriers 15 are raised by the continuous lift 10 and lowered by the continuous lift 11. Owing to the upward motion of the upstream continuous lift 10 at the top end of the straight run of the continuous lift runners 13 and 14 are lifted into the downwardly projecting pins and at the lower end of the straight run of the continuous lift runners 13 and 14 are lifted in the form of a workpiece carrier 15a, which has been moved into the empty position marked in broken lines in FIG. 5, out of the upwardly projecting entraining members 29. Adjacent to the downwardly moving continuous lift 11 the workpiece carriers 15 are moved downwards into the upwardly projecting entraining members 25 and at the top are lifted out, in the form of a workpiece carrier which has been placed in the empty position 15a, from the downwardly extending entraining members 29. FIG. 4 shows the engagement during the transfer action adjacent to the top end of the continuous lift. The operation or control of the transfer device 24 and the arrangement of the entraining members 19 and the opposite holders on the workpiece carriers associated is so designed that at the top and lower ends respectively of their upward and downward motion the workpiece carriers 15 enter one of the entraining members waiting in the appropriate positions.

At the respectively uppermost and lowermost guide channel 17 of the straight channel of the continuous lift runners 13 and 14 the mutually aligned guide channels 17, in which a transfer of the workpiece carriers takes place, are open along the facing sides so that transfer may take place. In the case of a larger distance between the adjacently placed continuous lifts it is possible to have stationary guide elements, aligned with the guide channels, in the intermediate space. In the part between these transfer positions, that is to say from a point above the lowermost guide channel as far as a point under the uppermost guide channel of the straight runs of the continuous lifts runners 13 and 14 the workpiece carriers 15 are locked in the length direction of the rails 16 and accordingly locked in the direction of transfer. For this purpose there are guide rails 30, shown in FIG. 2, running in parallelism to the direction of lifting and lowering of the continuous lifts, such rails 30 respectively forming a guide channel, ending in the upper and, respectively, lower displacement position, for holding elements 31, provided on the workpiece carriers 15 in the form of rollers or the like. The guide rails 30 may be in the form of channel section opening transversely in relation to the direction of displacement, that is to say in the present case opening to the outside. Such channel section rails run vertically, that is to say in parallelism to the direction of motion of the continuous lifts 10 and 11 and they are so arranged between the transfer positions that the holding elements 31 of the respectively uppermost and lowermost guide channel 17 of the straight run of the continuous lift runners 13 and 14 are released.

In the present case the workpiece carriers 15 consist, as will also be seen from FIG. 2, of a transverse beam 32 bridging over the distance between the continuous lift runners 13 and 14, on which beam support bars 33, extending in the direction of action of the longitudinal conveyor device 9, are secured like the tines of a rake. The outer support bars may in this design carry the rollers 18, fitting into the guide channels 17, and may carry the holding element 31 fitting into the guide rail 30. The longitudinal conveyor device 9, which is twice intersected by the workpiece carriers 15 in their closed circuit is, as may be seen from FIGS. 1 and 5, provided adjacent to the basket 4 with two interruptions 34, which are so arranged that the transverse beams 32, extending over the full width, of the workpiece carriers 15 on intersecting the conveying plane of the longitudinal conveyor device 9 may pass therethrough. As looked at across the width the longitudinal conveyor device 9 consists of a number of spaced belts, between which the support bars 33 of the workpiece carriers 15 may pass. For driving the inlet section of the longitudinal conveyor device 9 there is a drive motor 35 secured to the tower 1 with output gearing 36. The output section of the longitudinal conveyor device 9 is separately driven from the inlet section in the same manner. The interruptions 34 are in this case adjacent to the downstream side of the respectively associated continuous lift. The section located between these two interruptions 34 of the longitudinal conveyor device 9 is suitably driven with the outlet section. The separate driving facilities of the sections of the longitudinal conveyor device makes possible selective operation and discontinuance of the supply of material and of the output of material from the temporary storage device here illustrated.

During the case of normal, regular operation of the manufacturing stations supplied by the longitudinal conveyor device 9 all the sections of the longitudinal conveyor device 9 are driven and the continuous lifts 10 and 11 are placed in such a neutral setting that the conveyance plane of the longitudinal conveyor device 9 is located between two consecutive workpiece carriers 15 so that the workpieces placed on the longitudinal conveyor device 9 may be conveyed through the tower 1 without change in direction. In the case of a failure the output section of the longitudinal conveyor device 9 is put out of operation and only the input section will be left running. The incoming workpieces are temporarily stored by operation of the present temporary storage device until the failure of the plant has been repaired. For this purpose the workpieces are lifted with the aid of the workpiece carriers 15 at the continuous lift 10 moving the workpiece carriers upwards from the longitudinal conveyor device 9 and stored thereover, the paths, located over the longitudinal conveyor device 9, of the two continuous lifts 10 and 11 forming two parallel temporary storage paths connected by the transfer device 24 with each other, the length thereof being able to be modified by the lifting the basket 4, as will readily be seen by a glance at FIGS. 1 and 5. On removing the workpieces from temporary storage the workpieces placed on the workpiece carriers 15 are deposited adjacent to the continuous lift 11 conveying the workpieces on the workpiece carriers 15 in a downward direction on the longitudinal conveyor device 9, the temporary storage paths located above the longitudinal conveyor device 9 being shortened by lowering the basket 4. The parts, located under the longitudinal conveyor device 9, of the continuous lifts 10 and 11 form two workpiece carrier return paths, which are joined together by the transfer device 24 and whose length may be changed in a direction opposite to the length of the temporary storage paths.

The removal of the articles from temporary storage, that is to say the emptying of the temporary storage paths, takes place when further material is supplied. If the supply of further material takes place without interruption at the end of the temporary storage operation the material will flow through the temporary storage paths, the length of the paths being the same in this case owing to the fact that the basket is not moving. Irrespectively of whether the basket is being moved or not, that is to say whether there is removal from temporary storage or not, the workpiece carrier respectively reaching the transfer position at the top end of the continuous lift is shifted from the input continuous lift 10 running upwards to the output downwardly moving continuous lift 11, the number of the workpiece carriers located under the transfer position depending on the actual position of the basket 4, which, as we have seen, is halted in one position during operation without storage and during storage or removal from storage is lifted or lowered.

The drive of the respectively moved members takes place in steps with such a correlation that the respective desired operation mode, that is to say continuous conveying, taking into temporary storage or removal therefrom is achieved. During continuous conveying through the temporary storage device, that is to say with diversion of the workpieces in a loop between the inlet and outlet sections of the longitudinal conveyor device 9 the rates of the longitudinal conveyor device 9 and of the continuous lifts 10 and 11 placed on the basket which is then stationary, and of the transfer device 24 are equal. Only the phases of motion are so offset in relation to each other that trouble conditions may be avoided. During taking into temporary storage and removal therefrom the continuous lifts and the basket are alternately moved in steps. Their rate is in this case only half as the rate of the longitudinal conveyor device 9. The same applies for the rate of the transfer device 24. The two temporary storage paths are then made longer or shorter by the same amounts, it however being possible to maintain a flow of material in the form of a loop running upwards adjacent to the continuous lift 10 and running downwards adjacent to the continuous lift 11 so that the workpieces may in any case be kept in the same order on discharge from the longitudinal conveyor device 9 and taken off the latter again, in which respect owing to the linear displacement of the workpiece carriers by means of the transfer device 24 there is no turning over of the workpieces despite the flow of the material along a loop.

Figure 6:
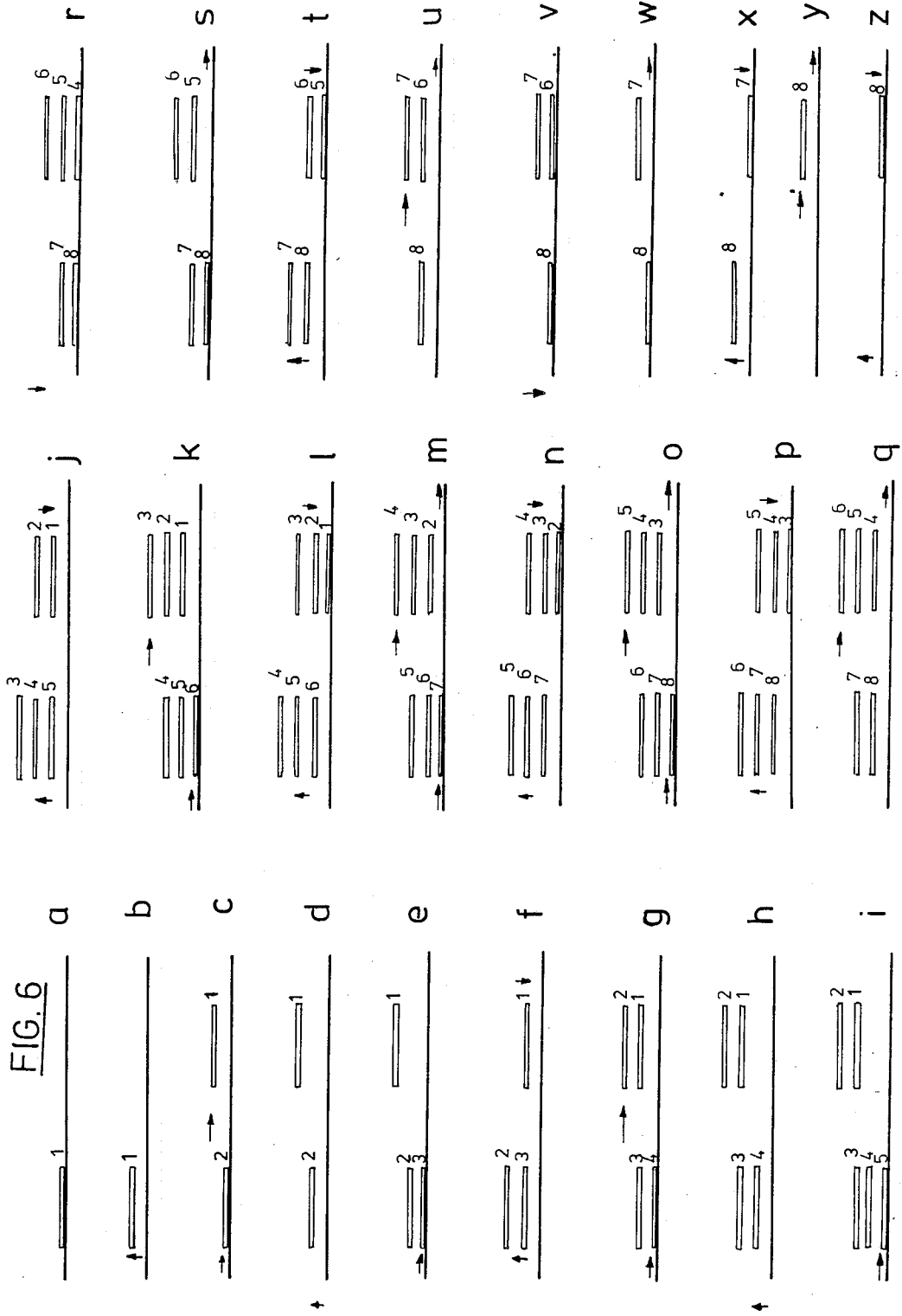
FIG. 6 is a flow chart for the material being conveyed in the apparatus in accordance with the invention.

The mutual matching of the phases of motion of the individual members during the different modes of operation is best indicated in FIG. 6. In this figure in each case one conveying plane of the longitudinal conveyor device 9 and the position of the workpiece carriers located thereover and charged with workpieces is indicated, such carriers being numbered 1 through 6 in accordance with their order. The figures parts 6a through 6k relate to the "taking into store" mode. The figure parts 6l to 6o relate to the mode "run-through after temporary storing" and the figures parts 6p through 6z relate to the "removal from storage" mode of operation.

During taking into storage only the input section of the longitudinal conveyor device 9 is in operation. After each step of this section of the longitudinal conveyor device 9 there is alternately one step of the oppositely moving continuous lifts 10 and 11 or of the basket 4. Together with each step following a continuous lift step, that is to say together with each second step of the longitudinal conveyor device 9 the transfer device 24 also performs a step in which it transfers the workpiece carriers 15, which have been brought into engagement by the preceding step of the continuous lifts 10 and 11 with it at the upper end of the continuous lift 10 and at the lower end of the continuous lift 11, into the receiving positions, which owing to the preceding step of the continuous lifts are not occupied and are formed by the channels 17, of the respective other continuous lift. The initial situation as shown in the figure part 6a corresponds in this respect to the position with the temporary storage device empty as is also indicated in FIG. 1. In this case the basket 4 is to be located in its lowermost setting so that the continuous lifts 10 and 11 extend past the longitudinal conveyor device 9 with one guide channel 17, that is to say one receiving positions for a workpiece carrier 15. The transfer devices 24 are then already to have vacated the one receiving position of the input continuous lift 10. The same applies for the lowermost receiving station of the continuous lift 11 under the longitudinal conveyor device. The first step which now takes place of the longitudinal conveyor causes the first workpiece to be moved into the reach of the first continuous lift 10, as is indicated in the figure part 6a. After this the continuous lifts 10 and 11 perform one step, the workpiece being lifted from the conveying plane of the longitudinal conveyor device 9 and moved into the transfer position, as is indicated by the figure part 6b. The next step which now takes place of the longitudinal conveyor device is accompanied by a step of the transfer device 24 so that the first workpiece is moved at the level of the transfer position within reach of the continuous lift 11 and a second workpiece is moved within reach of the continuous lift 10, this being indicated in the figure part 6c. Following this there is a step of the basket 4 so that the continuous lifts 10 and 11 overlap the conveying plane of the longitudinal conveyor device with two receiving positions in each case, the lower one of such receiving positions being vacant as indicated in the figure part 6d. During the ensuing step of the longitudinal conveyor device 9 a third workpiece is moved under the second workpiece within reach of the continuous lift 10, as indicated in the figure part 6e. Then there is a further step of the oppositely moving continuous lifts so that the first workpiece is moved adjacent to the continuous lift 11 by one position downwards and is accordingly is located in the first position of the continuous lift 11 over the longitudinal conveyor device 9. The second and third workpieces are shifted adjacent to the continuous lift 10 through one position upwards, as will be seen from the figure part 6f. This shift of the workpiece is possible because, owing to the preceding stroke of the basket 4 as in the figure part 6d, the required vacant receiving positions are made available. At the same time the workpiece carrier receiving the first workpiece moved out of engagement with the transfer device 24 and the workpiece carrier with the second workpiece is moved into engagement therewith. The reverse operation takes place at the lower end of the continuous lifts, as has already been indicated above. Then there is again a step of the inlet section of the longitudinal conveyor device and of the transfer device so that the second workpiece is positioned over the first workpiece within the reach of the output continuous lift and the fourth workpiece is moved under the third workpiece within the reach of the input continuous lift 10, as is indicated in the figure part 6g. In the operational phase shown in the figure part 6h the basket 4 is again lifted through one step. Then, as indicated in the figure part 6i there is again a step of the inlet section of the longitudinal conveyor device 9. and, as indicated in the figure part 6j, a step of the oppositely moving continuous lifts so that the latter are again capable of receiving workpieces and during the next common step of the longitudinal conveyor device and the transfer device as indicated in the figure part 6k the third workpiece will have taken up a position over the first and second workpiece within the range or reach of the output continuous lift 11 the third workpiece, while in the range of the inlet continuous lift 10 the sixth workpiece will have moved into place under the fourth and fifth workpieces. It is in this manner that the take up of workpieces may be continued until the capacity of the temporary storage device is exhausted, that is to say until the basket 4 is in its highest position.

In the case shown in FIG. 6 temporary storing is to be halted, and in fact the continuous lift 11 is to release the workpieces in step with the charging of the continuous lift 10 with further workpieces, the workpieces simply moving through the sections of the continuous lifts 10 and 11 which overlap the longitudinal conveyor device 9. During such run-through operation there is no motion of the basket 4. Each step of the longitudinal conveyor device and of the transfer device is accompanied by one step of the opposite continuous lifts. Starting with the situation as shown in the figure part 6k when the next step of the continuous lifts takes place the first, second and third workpieces within the range of the continuous lift 11 are shifted downwards through one position, while the fourth, fifth and sixth workpieces within the range of the continuous lift 10 are shifted one position upwards, the sixth workpiece being lifted clear of the longitudinal conveyor device, the fourth workpiece is moved within reach of the transfer device, the third workpiece is disengaged from the transfer device and the first workpiece is deposited on the longitudinal conveyor device, as will be seen from the figure part 6l. When the next step of the longitudinal conveyor device and of the transfer device takes place a further, seventh workpiece is moved into place under the sixth workpiece and the first workpiece is moved out of the temporary storage device, while the fourth workpiece is positioned over the third workpiece, as will be seen from the figure part 6m. The next following step of the continuous lifts again leads to the situation as in the figure part 6l but with the difference that the second workpiece is deposited on the longitudinal conveyor device and the seventh workpiece is the lowest workpiece within the reach of the continuous lift 10, as will be seen from the figure part 6n. The next step of the longitudinal conveyor device and of the transfer device to take place the leads to the same situation as in the figure part 6m with the difference that an eighth workpiece has been brought within the reach of the input continuous lift 10 and the second workpiece has been moved out of the temporary storage device as the reader will be able to see from the figure part 6o. This run-through operation may be continued indefinitely until either an operational disorder makes it imperative to continue the "temporary storing" mode of operation or the supply of further material ceases so that there is a net removal of material from the temporary storage device. This is illustrated in the figures parts 6p to 6z.

In the "removal from temporary storage" mode of operation, as is the case with "temporary storage" the continuous lifts and the basket each alternately perform one step between the steps of the longitudinal conveyor device, but with the difference that the steps of the basket 4 are downwards. The longitudinal conveyor device in this case only has its output section in operation so that there is no supply of further material. The transfer device again operates following one step of the continuous lifts with each step of the longitudinal conveyor device. As will be seen from the figures parts 6p through 6z one workpiece after the other is moved by the continuous lift 10 within the reach of the continuous lift 11 and the removed from the temporary storage device until the last, in this case the eighth workpiece is removed, as is indicated in the figure part 6z.

From the diagram of figure 6 it will be readily seen that the workpieces in each case are discharged from the temporary storage device in the same order in which they were placed in it and that the workpieces are not turned over so that the side of the workpieces turned upwards will also be turned upwards when the workpieces leave the temporary storage device.

The above description relates simply to a preferred working example of the invention with two parallel continuous lifts. It would however naturally be possible to redesign the apparatus with a larger number of pairs of continuous lifts with for instance four or six or even more continuous lifts in order to increase the capacity of the temporary storage device. In this case the placing into temporary storage and the removal therefrom there will be a movement of the basket after each of the number, corresponding to the number of temporary storage paths, of steps of the longitudinal conveyor device.

I claim:

1. A method for conveying workpieces in sequence along a conveying path in a step-by-step fashion for buffering workpieces, comprising the steps of:
    diverting the workpieces from the conveying path to and along at least one loop path temporary storage device having two temporary storage paths moving the two temporary storage paths in opposite directions to one another, changing a length of each said temporary storage path jointly depending upon an increase or a decrease in a degree of filling of said temporary storage device, whereby after two steps of the conveying path for each loop path, the temporary storage device is moved by one step when the temporary storage paths thereof are stationary and, after each movement of the temporary storage paths with the temporary storage device being inactive, transferring of the workpieces from an end of one temporary storage path to an end of another temporary storage path takes place, said transferring taking place parallel to the conveying path.

2. The method as claimed in claim 1, further including maintaining the length of the temporary storage paths is kept the same by omitting temporary storage device motion of the temporary storage device while the temporary storage device is at the same level of filling.

3. The method as claimed in claim 1 wherein the step of changing includes extending the length of each temporary storage path when the filling of said temporary storage device is increased and the length of each temporary storage path is shortened when the filling of said temporary storage device is decreased.

4. An apparatus for a conveyance of workpieces, comprising:
    a longitudinal conveyor device;
    a temporary storage device arranged transversely to said longitudinal conveyor device;
    a basket through which said longitudinal conveyor device extends;
    means for moving said basket at a right angle to said longitudinal conveyor device;
    a transfer device mounted on said basket;
    slidingly mounted workpiece carriers;
    at least two continuous lifts arranged in a parallel relationship to a direction of motion of said basket, said at least two continuous lifts being mutually offset in a direction of motion of said longitudinal conveyor device with said continuous lifts being adapted to have sides thereof aligned with a longitudinal conveying direction fitted with the slidingly mounted workpiece carriers, said workpiece carriers intersecting said longitudinal conveyor device within a zone of side ends of said longitudinal conveyor device, said workpiece carriers being capable of being shifted by means of the transfer device in opposite directions, parallel with said longitudinal conveyor device, through a distance equal to a spacing between said continuous lifts; and, means for driving said continuous lifts in opposite directions.

5. The apparatus as claimed in claim 4 comprising a tower in which said basket is able to be moved upwards and downwards, said longitudinal conveyor device being adapted to run through said tower, the height of said tower exceeding the height of the basket at least by the length of a straight run of the continuous lifts, said longitudinal conveyor device being arranged with a floor clearance which is at least equal to the length of the said straight run of the continuous lifts.

6. The apparatus as claimed in claim 5 wherein the tower has a rectangular cross section with corners at which there are lifting chains connected with corners of said basket; which also has a rectangular cross section, said chains being trained over bend means at a top end of said tower.

7. The apparatus as claimed in claim 6 further comprising rollers and columns at the corners of said tower, said columns having inner edges on which preferably adjustably mounted guide rails are mounted on which said rollers on the corners of the basket run, said rollers being arranged at a right angle to each other.

8. The apparatus as claimed in claim 7 comprising at least one bevel drive connecting said continuous lifts which are arranged opposite to each other, said bevel drive having one input and two outputs.

9. The apparatus as claimed in claim 8 comprising support rails mounted on said continuous lifts so as to extend in the longitudinal conveyor direction and furthermore endless runners on which said support rails are mounted, said runners being arranged to change in direction at the top and lower ends of said basket, said workpiece carriers being slidingly mounted on said support rails.

10. The apparatus as claimed in claim 9 wherein the continuous lifts each have two runners, which are opposite to each other in relation to the longitudinal conveyor device, said runners with said support rails being arranged in pairs.

11. The apparatus as claimed in claim 10 wherein said workpiece carriers are provided with lateral rollers running between two respective support rails.

12. The apparatus as claim in claim 11, further comprising associated rollers for the workpiece carriers wherein the support rails of a runner of the continuous lifts and the associated rollers of the workpiece carriers have mutually complementary cross-sections.

13. The apparatus as claimed in claim 12 further comprising a holding element for said workpiece carriers and guide rails, with each of said guide rails having a guide channel for the holding element running into said channel, wherein the workpiece carriers, within a zone defined between points of change of direction of said continuous lifts and an upper end and a lower end of said basket, are secured by the guide rails so as to preclude displacement of the workpiece carriers from the associated support rails.

14. The apparatus as claimed in claim 13, further comprising counter-holders being fitted on said workpiece carriers wherein said transfer device is in the form of a circulating member encircling said two continuous lifts, said circulating member being fitted with drivers and adapted for engagement with, and disengagement from, said counter-holders by at least one of said continuous lifts.

15. The apparatus as claimed in claim 14, wherein said longitudinal conveyor device is provided in the form of a belt guide being formed by laterally offset belts, said longitudinal conveyor device having at least one interruption therein at each continuous lift so that said workpiece carriers are able to be by-passed without colliding.

16. The apparatus as in claim 15 wherein the workpiece carriers have at least one transverse beam extending over a breadth of the basket and passing through the interruptions in the longitudinal conveyor device said beam mounting support bars able to be moved between the belts of the belt guide forming the longitudinal conveyor device.

17. The apparatus as claimed in claim 16 wherein the driving means associated respectively with the basket, the continuous lifts, the transfer device and the longitudinal conveyor are in the form of separate drive units able to be operated in steps.

* * * * *